United States Patent
Coutts

(10) Patent No.: US 9,429,610 B2
(45) Date of Patent: Aug. 30, 2016

(54) VOLTAGE DEPENDENT DIE RC MODELING FOR SYSTEM LEVEL POWER DISTRIBUTION NETWORKS

(71) Applicant: QUALCOMM Incorporated, San Diego, CA (US)

(72) Inventor: Ryan Michael Coutts, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/157,451

(22) Filed: Jan. 16, 2014

(65) Prior Publication Data

US 2015/0198646 A1    Jul. 16, 2015

(51) Int. Cl.
*G01R 27/26* (2006.01)
*G06F 9/455* (2006.01)
*G06F 17/50* (2006.01)

(52) U.S. Cl.
CPC ....... *G01R 27/2605* (2013.01); *G06F 17/5036* (2013.01); *G06F 2217/78* (2013.01)

(58) Field of Classification Search
CPC .............. G01R 27/2605; G01R 31/28; G06F 17/5036; G06F 2217/78
USPC .......................... 324/658–690; 716/109, 133
See application file for complete search history.

(56) References Cited

U.S. PATENT DOCUMENTS

| | | | |
|---|---|---|---|
| 5,461,338 A | 10/1995 | Hirayama et al. | |
| 5,646,543 A | 7/1997 | Rainal | |
| 5,694,949 A | 12/1997 | Reggiardo | |
| 5,751,651 A | 5/1998 | Ooishi | |
| 5,781,062 A | 7/1998 | Mashiko et al. | |
| 5,801,576 A | 9/1998 | Ooishi | |
| 5,929,687 A | 7/1999 | Yamauchi | |
| 5,973,507 A | 10/1999 | Yamazaki | |
| 6,064,223 A | 5/2000 | Lu et al. | |
| 6,184,729 B1 | 2/2001 | Pasqualini | |
| 6,222,388 B1 | 4/2001 | Bridgewater, Jr. | |
| 6,225,852 B1 | 5/2001 | Cleveland et al. | |

(Continued)

FOREIGN PATENT DOCUMENTS

| | | |
|---|---|---|
| EP | 0955573 A1 | 11/1999 |
| JP | 9231756 A | 9/1997 |

(Continued)

OTHER PUBLICATIONS

Chang C., et al., "Direct Measurement of C_be and C_bc Versus Voltage for Small HBT's with Microwave s-Parameters for Scaled Gummel-Poon BJT Models", IEEE Transactions on Microwave Theory and Techniques, IEEE Service Center, Piscataway, NJ, US, vol. 47, No. 1, Jan. 1, 1999, pp. 108-110, XP011037460, ISSN: 0018-9480.

Chen K-M et al., "Characterization and Modeling of SOI Varactors at Various Temperatures", IEEE Transactions on Electron Devices, IEEE Service Center, Pisacataway, NJ, US, vol. 51, No. 3, Mar. 1, 2004, pp. 427-433, XP011107824, ISSN: 0018-9383, DOI: 10.1109/7E0.2003.822585.

(Continued)

*Primary Examiner* — Farhana Hoque
(74) *Attorney, Agent, or Firm* — Loza & Loza LLP

(57) ABSTRACT

Techniques for determining the voltage-dependent capacitance of a circuit are described herein. In one embodiment, a method for determining voltage-dependent capacitance of a circuit comprises measuring a parameter of the circuit at each one of a plurality of voltages, and, for each voltage, determining a capacitance of the circuit at the voltage by fitting a resistor-capacitor (RC) model of the circuit to the measured parameter of the circuit at the voltage.

23 Claims, 13 Drawing Sheets

(56) References Cited

U.S. PATENT DOCUMENTS

| | | |
|---|---|---|
| 6,329,874 B1 | 12/2001 | Ye et al. |
| 6,744,301 B1 | 6/2004 | Tschanz et al. |
| 6,750,680 B2 | 6/2004 | Zama et al. |
| 7,102,254 B2 | 9/2006 | Veendrick et al. |
| 7,176,745 B2 | 2/2007 | Itoh et al. |
| 7,276,932 B2 | 10/2007 | Kuang et al. |
| 7,355,455 B2 | 4/2008 | Hidaka |
| 7,659,746 B2 | 2/2010 | Chua-Eoan et al. |
| 8,063,664 B2 | 11/2011 | Chua-Eoan et al. |
| 2003/0074594 A1 | 4/2003 | Hirakawa et al. |
| 2004/0080340 A1 | 4/2004 | Hidaka |
| 2004/0227542 A1 | 11/2004 | Bhavnagarwala et al. |
| 2004/0263237 A1 | 12/2004 | Kim et al. |
| 2006/0022712 A1 | 2/2006 | Berthold et al. |
| 2008/0066035 A1* | 3/2008 | Asao .............. G06F 17/5036 716/108 |
| 2009/0102287 A1 | 4/2009 | Nakashima |
| 2011/0115507 A1 | 5/2011 | Heaney |
| 2012/0098553 A1 | 4/2012 | Karlsson et al. |
| 2012/0275225 A1 | 11/2012 | Huynh et al. |
| 2013/0016573 A1 | 1/2013 | Goel et al. |

FOREIGN PATENT DOCUMENTS

| | | |
|---|---|---|
| JP | 2003289245 A | 10/2003 |
| JP | 2004221243 A | 8/2004 |

OTHER PUBLICATIONS

Partial International Search Report—PCT/US2015/011658—ISA/EPO—Apr. 8, 2015.

Lee-Kee, et al., "Power Gate Design Optimization and Analysis with Silicon Correlation Results," Intel Corporation, pp. 1-pp. 16, 2009.

International Search Report and Written Opinion—PCT/US2015/011658—ISA/EPO—Jun. 9, 2015.

Kim S., et al., "Minimizing inductive noise in system-on-a-chip with multiple power gating structure," European solid state circuits 2003, Esscirc 03 conference on Sep. 16-18, 2003, piscataway, NJ, USA, IEEE, Sep. 16, 2003, pp. 635-638, XP010677246.

Kozhaya J.N., et al., "An Electrically Robust Method for Placing Power Gating Switches in Voltage Islands," Custom Integrated Circuits Conference, 2004, Proceedings of the IEEE 2004 Orlando, FL, USA, Oct. 3-6, 2004, Piscataway, NJ, USA, IEEE, Oct. 2, 2004, pp. pp. 321-324, XP10742304A.

Royannez P., et al., "90nm low leakage SoC design techniques for wireless applications," Solid-State Circuits Conference, Digest of Technical Papers ISSCC, IEEE International, San Francisco, CA, USA Feb. 6-10, 2005, IEEE, Piscataway, NJ, USA, Jan. 1, 2005, vol. 1, pp. 138, 139 & 589, XP031173684, DOI: 10.1109/ISSCC.2005.1493907, ISBN: 978-0-78038904-5.

* cited by examiner

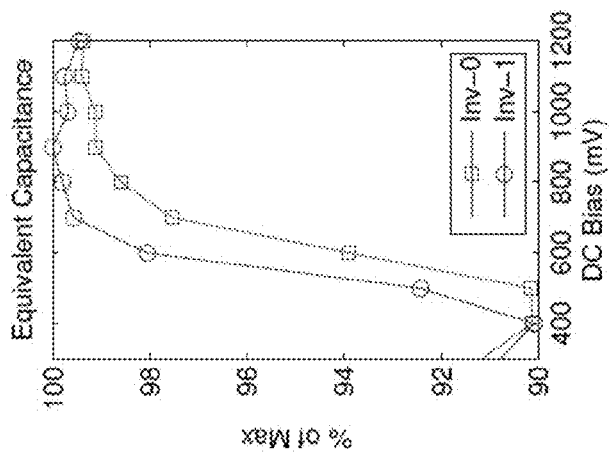
FIG. 7
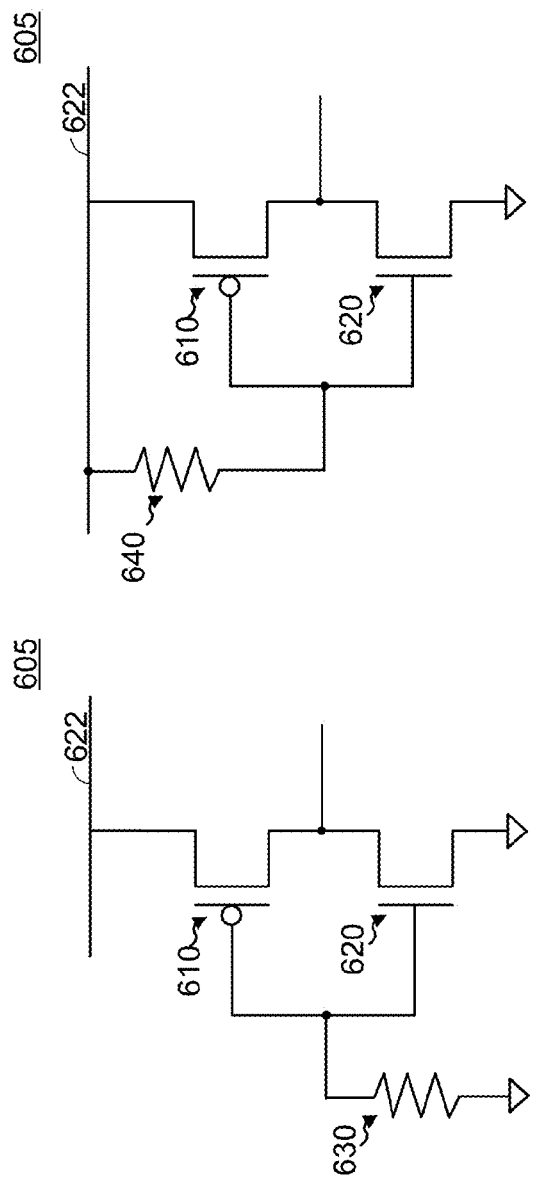
FIG. 6B
FIG. 6A

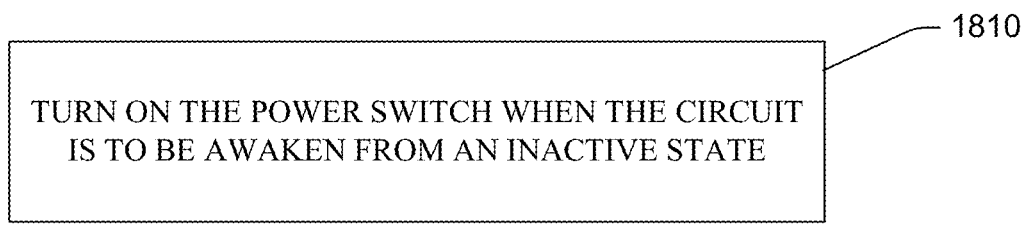
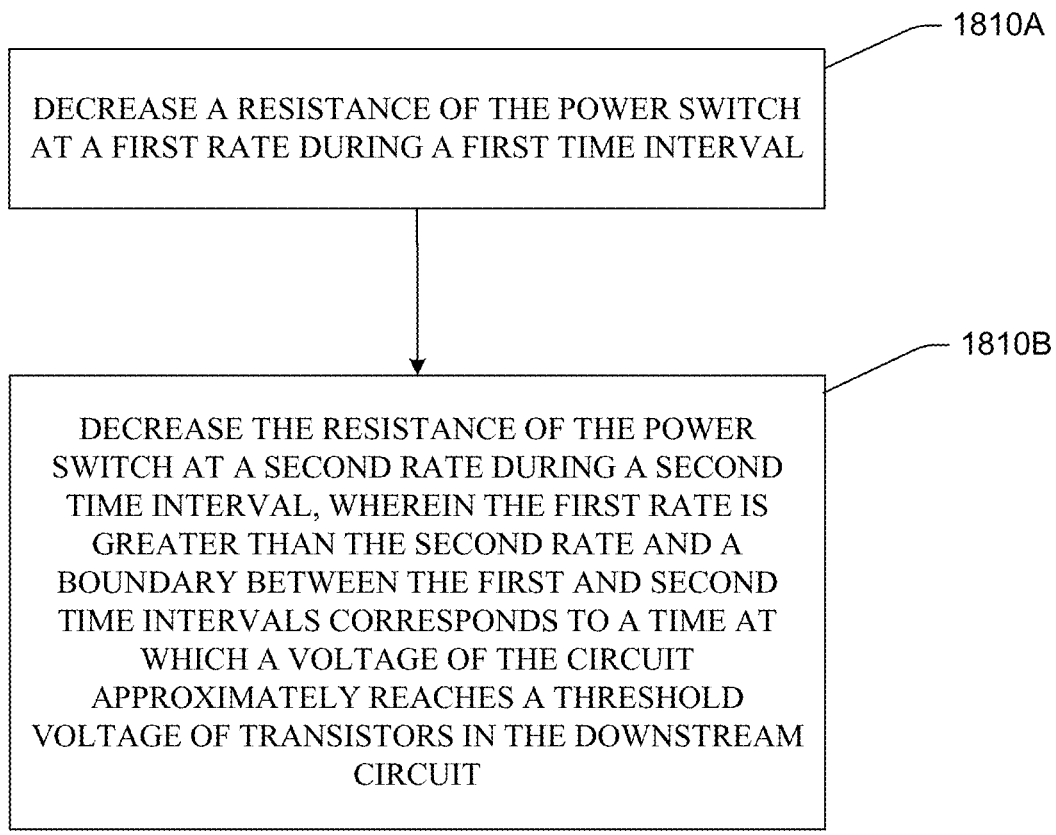

VOLTAGE DEPENDENT DIE RC MODELING FOR SYSTEM LEVEL POWER DISTRIBUTION NETWORKS

BACKGROUND

1. Field

Aspects of the present disclosure relate generally to power distribution networks, and more particularly, to voltage dependent die RC modeling for power distribution networks.

2. Background

A power distribution network (PDN) may be used to distribute power from a power supply (e.g., a battery) to various circuits on a die. To conserve power, the PDN may employ powering gating, in which the PDN disconnects a circuit from the power supply when the circuit is inactive to prevent power leakage from the circuit. As the dimensions of circuits scale down into the deep nanometer range, power leakage significantly increases. Therefore, power gating is becoming increasingly important to reduce power consumption and extend the battery life of mobile devices.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for determining voltage-dependent capacitance of a circuit is described herein. The method comprises measuring a parameter of the circuit at each one of a plurality of voltages, and, for each voltage, determining a capacitance of the circuit at the voltage by fitting a resistor-capacitor (RC) model of the circuit to the measured parameter of the circuit at the voltage.

A second aspect relates to a system comprising a circuit, and a power switch. The power switch is configured to connect the circuit to a power supply when the circuit is in an active state, and to disconnect the circuit from the power supply when the circuit is in an inactive state, wherein the power switch has a variable resistance. The system further comprises a switch control circuit configured to control the resistance of the power switch as the circuit powers up from the inactive state to the active state by decreasing the resistance of the power switch at a first rate during a first time interval, and decreasing the resistance of the power switch at a second rate during a second time interval immediately following the first time interval, wherein the first rate is greater than the second rate, and a boundary between the first and second time intervals corresponds to a time at which a voltage of the circuit approximately reaches a threshold voltage of transistors in the circuit.

A third aspect relates to a method for power gating in a system comprising a circuit and a power switch coupled between the circuit and a power supply. The method comprises turning on the power switch when the circuit is to be awaken from an inactive state. Turning on the power switch comprises decreasing a resistance of the power switch at a first rate during a first time interval, and decreasing the resistance of the power switch at a second rate during a second time interval immediately following the first time interval, wherein the first rate is greater than the second rate, and a boundary between the first and second time intervals corresponds to a time at which a voltage of the circuit approximately reaches a threshold voltage of transistors in the circuit.

A fourth aspect relates to an apparatus for power gating in a system comprising a circuit and a power switch coupled between the circuit and a power supply. The apparatus comprises means for turning on the power switch when the circuit is to be awakened from an inactive state. The means for turning on the power switch comprises means for decreasing a resistance of the power switch at a first rate during a first time interval, and means for decreasing the resistance of the power switch at a second rate during a second time interval immediately following the first time interval, wherein the first rate is greater than the second rate, and a boundary between the first and second time intervals corresponds to a time at which a voltage of the circuit approximately reaches a threshold voltage of transistors in the circuit.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIGS. 6A and 6B show configurations for determining the voltage-dependent capacitances of an inverter for two different input states according to an embodiment of the present disclosure.

FIG. 7 is a plot showing voltage-dependent capacitances of the inverter for two different input states according to embodiment of the present disclosure.

FIGS. 18A and 18B show a method for power gating according to an embodiment of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
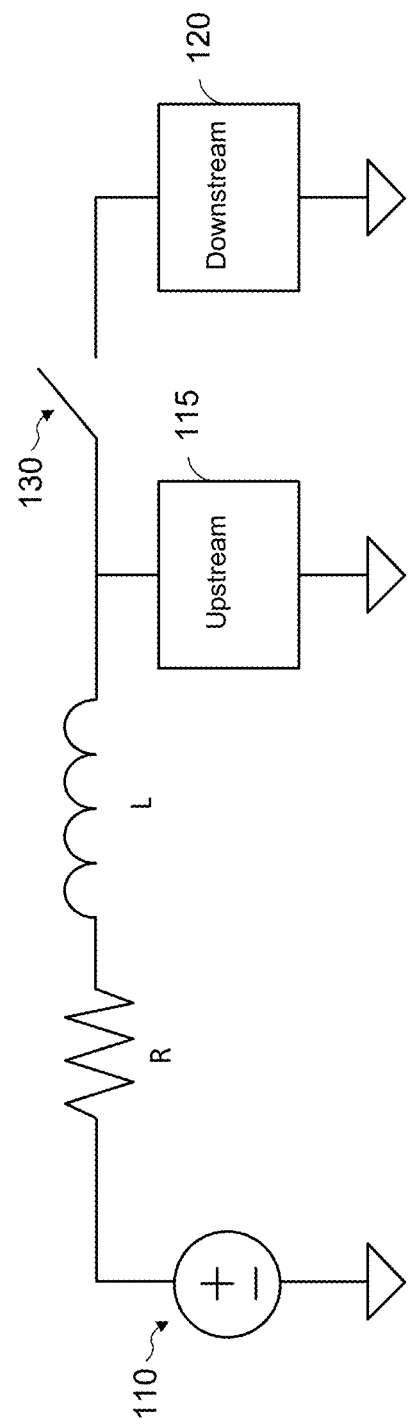
FIG. 1 shows an example of a power distribution network (PDN) for distributing power to an upstream circuit and a downstream circuit.

FIG. 1 shows an example of a power distribution network (PDN) for distributing power from a DC power supply 110 to an upstream circuit 115 and a downstream circuit 120. The inductor L and the resistor R in FIG. 1 model inductance and resistance, respectively, of board and packaging interconnects between the power supply 110 and the circuits 115 and 120. The upstream circuit 115 and the downstream circuit 120 may be located on the same die.

The PDN may employ power gating to conserve power. In this regard, the PDN includes a power switch 130 for selectively connecting the downstream circuit 120 to the power supply 110. When the downstream circuit 120 is active, a power management circuit (not shown) turns on the power switch 130 to supply power to the downstream circuit 120. When the downstream circuit 120 is inactive, the power management circuit turns off the power switch 130 to disconnect the power supply 110 from the downstream circuit 120. This reduces power consumption when the downstream circuit 120 is inactive.

It is desirable for the power switch 130 to have a very low resistance when the downstream circuit 120 is active to minimize the IR (current (I) times resistance (R)) voltage drop across the power switch 130. However, this can lead to a large droop in the supply voltage at the upstream circuit 115 when the downstream circuit 120 is first awakened. The large voltage droop is caused by capacitors in the downstream circuit 120, which have approximately no charge when the downstream circuit 120 is first awakened from the inactive state (when power switch 130 is first closed). As a result, when the upstream circuit 115 and downstream circuit 120 are initially connected by the power switch 130, a large amount of charge quickly flows from capacitors in the upstream circuit 115 to capacitors in the downstream circuit 120, causing the supply voltage at the upstream circuit 115 to droop. The PDN is not able to react fast enough to prevent the large voltage droop due to the inductor L between the power supply 110 and the circuits 115 and 120.

The size of the voltage droop is a function of the capacitance of the downstream circuit 120. The larger the capacitance of the downstream circuit 120, the larger the voltage droop. For an ideal power switch 130 having zero on resistance, the voltage droop may be approximated by:

$$Droop = \left(1 - \frac{C_{up}}{C_{up} + C_{down}}\right) \cdot 100\% \quad (1)$$

where $C_{up}$ is a capacitance of the upstream circuit 115, and $C_{down}$ is a capacitance of the downstream circuit 120. Because equation (1) assumes an ideal switch with zero on resistance and a real switch has some amount of on resistance, equation (1) predicts a voltage droop that is larger than the actual voltage droop. However, for a switch with a very low on resistance, equation (1) provides a good approximation of the voltage droop. As can be seen from equation (1), the voltage droop can be large when the capacitance of the downstream circuit 120 is large relative to the capacitance of the upstream circuit 115. For example, when $C_{up}$ and $C_{down}$ are approximately equal, the voltage droop is approximately 50%, which is unacceptable high in most cases.

A large voltage droop is undesirable because it can cause logic in the upstream circuit 115 to malfunction. A large voltage droop can also cause propagation delays in the upstream circuit 115 to increase, which can lead to timing problems in the upstream circuit 115. Therefore, it is important to keep the voltage droop within an acceptable limit (e.g., 5%) to ensure that the upstream circuit 115 functions properly.

One approach to keep the voltage droop within an acceptable limit is to implement the power switch 130 using a variable-resistance power switch. When the downstream circuit 120 is first awakened, the power switch 130 has a relatively high resistance to limit the rate of charge transfer from the upstream circuit 115 to the downstream circuit 120, and therefore reduce the voltage droop. The resistance of the power switch 130 decreases over time, providing time for charge from the power supply 110 to power up the downstream circuit 120 through the inductor L. When the voltage at the power rail of the downstream circuit 120 settles to a voltage close to the nominal supply voltage, the resistance of the switch becomes low.

The variable-resistance power switch 130 may be implemented using a plurality of switches (e.g., transistor switches) coupled in parallel. When the downstream circuit 120 is awakened, the switches may be turned on over a period of time, in which the resistance of the power switch 130 decreases as more of the switches are turned on. In one example, the switches may include one or more weak switches (high-resistance switches) and one or more strong switches (low-resistance switches). A weak switch may have a resistance that is 10-20 times higher than the resistance of a strong switch. In this example, the weak switches may be turned on first to prevent a large voltage droop while the strong switches may be turned when the voltage at the power rail of the downstream circuit 120 settles to a voltage close to the nominal supply voltage.

Thus, the resistance of the power switch 130 may be adjusted to prevent a large voltage droop at the upstream circuit 115 when the downstream circuit 120 is first awakened. There is a tradeoff between the size of the voltage droop at the upstream circuit 115 and the wakeup time of the downstream circuit 120. Increasing the initial resistance of the power switch 130 reduces the voltage droop at the expense of increasing the wakeup time. Therefore, it is important to accurately model the capacitance of the downstream circuit 120 in order to design a power switch 130 that optimizes both voltage droop and wakeup time.

Conventional modeling techniques model the capacitance of the downstream circuit 120 as a fixed capacitance, ignoring voltage dependencies of the capacitance. This oversimplified model can lead to a large overestimation of the capacitance of the downstream circuit 120 when the power switch 130 is first turned on, and therefore a large overestimation of voltage droop. This may be explained by way of the following example.

Figure 2:
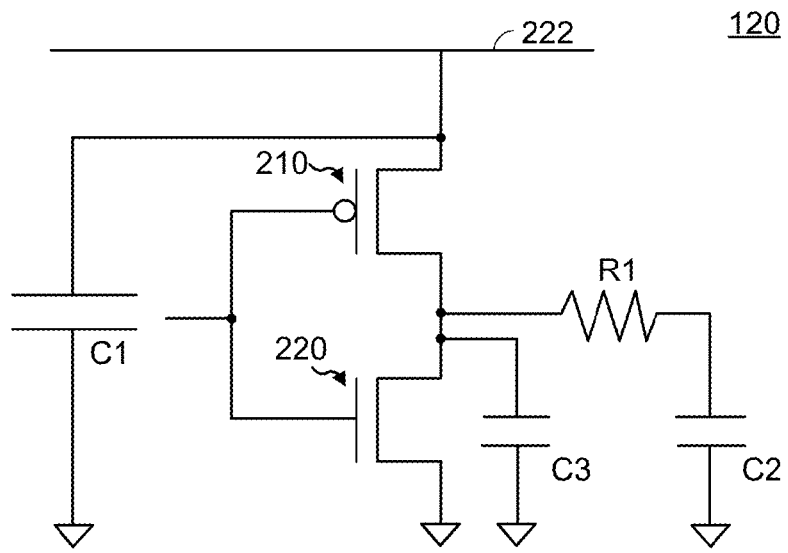
FIG. 2 shows an example of an inverter having a voltage-dependent capacitance as seen by the PDN.

FIG. 2 shows an example of the downstream circuit 120 comprising an inverter formed by a P-type field effect transistor (PFET) 210 and an N-type field effect transistor (NFET) 220. The circuit 120 also comprises a first capacitor C1, a second capacitor C2, and a third capacitor C3. In this example, the first capacitor C1 represents an intrinsic capacitance of the PEFT 210 (e.g., N-well capacitance of the PFET 210), the second capacitance C2 represents parasitic capacitance of a wire connected to the output of the inverter, and the third capacitance C3 represents an intrinsic capacitance of the NEFT 220 (e.g., drain-to-body capacitance of the NFET 220). Resistor R1 in FIG. 2 represents resistance of the wire. Although one inverter is shown in FIG. 2 for ease of illustration, it is to be appreciated that the downstream circuit 120 may include many inverters and/or other logic devices.

When the downstream circuit 120 is disconnected from the power supply 110 in the inactive state, the capacitors in the downstream circuit 120 are discharged due to leakage current, and the voltage at the supply rail 222 of the downstream circuit 120 is approximately zero volts. Assuming the gates of the PFET 210 and the NFET 220 are driven low, when the power switch 130 is initially turned on to power up the downstream circuit 120, the PFET 210 is initially turned off. This is because the source-to-gate voltage of the PFET 210 is initially well below the absolute threshold voltage $V_{th}$ of the PFET 210. As a result, the second capacitor C2 and the third capacitor C3 are initially isolated from the PDN, and therefore do not contribute to the capacitance of the downstream circuit 120 initially seen by the PDN.

As the voltage at the supply rail 222 rises, the PFET 210 turns on. This creates a channel between the source and drain of the PFET 210, thereby opening a path between the PDN and the second and the third capacitors C2 and C3. Thus, as the voltage at the supply rail 222 rises, the PDN sees more of the capacitance from the second and third capacitors C2 and C3. As a result, the capacitance of the downstream circuit 120 seen by the PDN increases.

Figure 3:
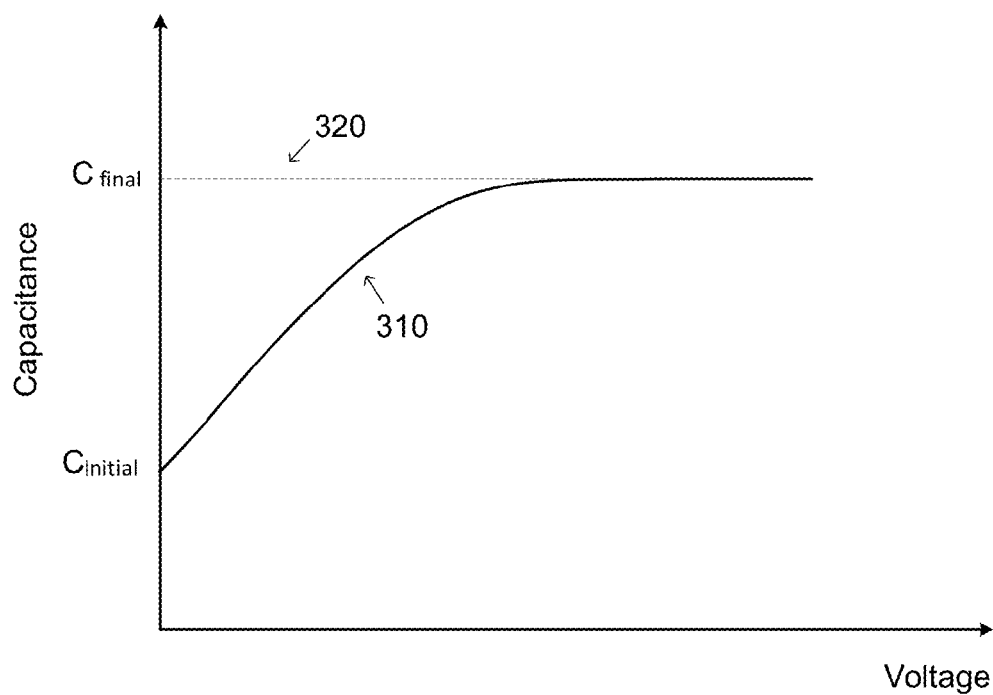
FIG. 3 is a plot showing an example of the capacitance of the inverter as a function of voltage.

This is illustrated in FIG. 3, which shows the capacitance 310 of the downstream circuit 120, as seen by the PDN, as a function of voltage at the supply rail 222. When the power switch 130 is first turned on, the voltage at the supply rail 222 is approximately zero volts, and the capacitance 310 is $C_{initial}$, which includes the capacitance of the first capacitor C1. As the voltage rises, the PFET 210 turns on, opening a path between the PDN and the second and third capacitors C2 and C3. As a result, the capacitance 310 seen by the PDN increases with increasing voltage. When the voltage reaches the absolute threshold voltage $V_{th}$ of the PFET 210, the PFET 210 is fully turned on, and the capacitance 310 seen by the PDN approaches $C_{final}$, which is the capacitance of the downstream circuit 120 when the downstream circuit 120 is fully powered up.

It is to be appreciated that the capacitance of the second capacitor C2 is not necessarily voltage dependent itself. The capacitance of the second capacitor C2, as seen by the PDN, is voltage dependent in this example because the path between the PDN and the second capacitor C2 through the PFET 210 (and hence the ability of the PDN is see the capacitance of the second capacitor C2) is voltage dependent. The same holds for the third capacitor C3.

It is to be appreciated that other capacitors may also contribute to the voltage-dependent capacitance of the downstream circuit 120 besides the capacitors shown in the example in FIG. 3. It is also to be appreciated that the example in FIG. 3 illustrates just one of many ways in which the capacitance of the downstream circuit 120 may be voltage dependent. Generally, the capacitance of the downstream circuit 120, as seen by the PDN, increases with increasing voltage. This is because transistors within the downstream circuit 120 turn on with increasing voltage, causing the transistors to open paths between the PDN and capacitors within the downstream circuit 120.

In the above example, conventional modeling techniques simply model the capacitance of the downstream circuit 120 as a fixed capacitance approximately equal to $C_{final}$. This is represented by the dashed line 320 in FIG. 3. Therefore, in this example, conventional modeling techniques greatly overestimate the capacitance initially seen by the PDN, which leads to a large overestimation of voltage droop.

Thus, conventional modeling techniques can greatly overestimate the capacitance seen by the PDN when the power switch 130 is initially turned on. This causes a circuit designer to overestimate voltage droop, and therefore determine an initial resistance for the power switch 130 that is much larger than needed to stay within a voltage-droop limit. This has the undesirable effect of extending the wakeup time of the downstream circuit 120 unnecessarily.

Embodiments of the present disclosure provide techniques for modeling the voltage-dependent capacitance of a downstream circuit, thereby allowing a circuit designer to better optimize the resistance of a power switch compared with modeling techniques that model the capacitance of a downstream circuit 120 as a fixed capacitance. Embodiments of the present disclosure also provide techniques for modeling the voltage-dependent resistance of a downstream circuit.

In one embodiment, the voltage-dependent capacitance and resistance of a downstream circuit 120 are estimated by fitting a voltage-dependent RC circuit model of the downstream circuit 120 to measured impedances of the downstream circuit 120 obtained using, for example, a computer simulator (e.g., a simulation program with integrated circuit emphasis (SPICE) simulator). As used herein, the term "measurement" may refer to a measurement performed on a computer simulation of a device or a measurement of a physical device.

In this embodiment, the impedance of the downstream circuit 120 is measured at each one of a plurality of different DC voltages, which may span a voltage range anywhere between zero volts and the supply voltage of the PDN. For each DC voltage, the RC model of the downstream circuit 120 is fitted to the measured impedance at the DC voltage to determine the capacitance and resistance of the downstream circuit 120 at the DC voltage. Thus, the capacitance and resistance of the downstream circuit 120 are determined at each one of the plurality of different DC voltages, thereby characterizing the voltage-dependences of the capacitance and resistance of the downstream circuit 120 over the voltage range of the DC voltages.

Figure 4:
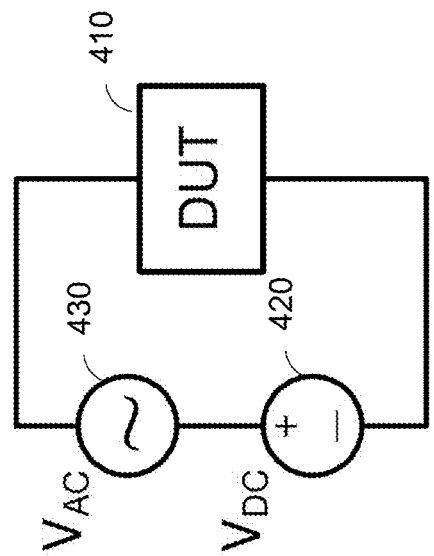
FIG. 4 shows a test setup for determining the voltage-dependent capacitance and resistance of a device according to an embodiment of the present disclosure.

FIG. 4 below shows an exemplary test setup for measuring the impedance of a downstream circuit 120 using, for example, a computer simulator, in which the downstream circuit 120 is treated as a nonlinear device under test (DUT) 410. The DUT 410 is DC biased by a DC voltage source 420 and excited by a small AC voltage source 430 (e.g., microvolt amplitude) over a frequency range (e.g., zero to 100 MHz). The DC voltage source 420 may be sequentially set to each one of a plurality of different DC voltages, in which the impedance of the DUT 410 is measured over the frequency range at each DC voltage, as discussed further below.

In this example, the computer simulator measures the S-parameter of the DUT 410 over the frequency range at each DC voltage. The S-parameter at each DC voltage is then converted into impedance using the following equation:

$$Z = \frac{Z_P(S_{11} + 1)}{1 - S_{11}} \quad (2)$$

where $S_{11}$ is the input port voltage coefficient, Z is the input impedance, and $Z_P$ is the characteristic impedance of the nonlinear device model. Thus, the computer simulator provides a measurement of the impedance Z of the DUT 410 over the frequency range at each DC voltage.

Figure 5:
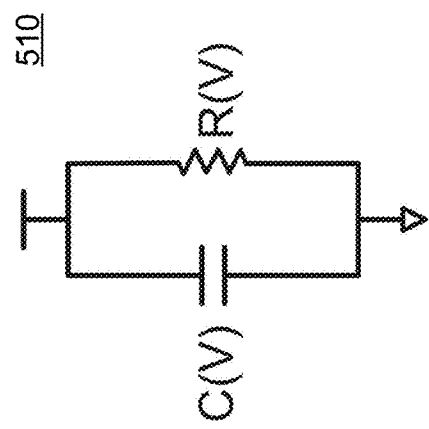
FIG. 5 shows an example of a parallel resistor-capacitor (RC) model according to an embodiment of the present disclosure.

For each DC voltage, an RC circuit model of the DUT 410 is fitted to the measured impedance Z of the DUT 410 at the DC voltage to determine the resistance and capacitance of the DUT 410 at the DC voltage. In this regard, FIG. 5 shows an example of a parallel RC circuit model 510 that may be used. The RC model 510 comprises a voltage-dependent capacitor C(V) in parallel with a voltage-dependent resistor R(V), and has a single pole. The parallel RC model 510 works well when the DUT 410 has a dominate pole within the frequency range of interest, and therefore can be accurately modeled as a parallel RC circuit. At each DC voltage, the impedance of the RC model 610 is given by the following equation in the Laplace domain:

$$Z = \frac{R}{1 + sCR} \quad (3)$$

where $s = j2\pi f$ and represents the complex angular frequency in the Laplace domain, R is the resistance at the DC voltage, and C is the capacitance at the DC voltage.

A method for determining the capacitance and resistance of the DUT 410 at a particular DC voltage using the measured impedance Z of the DUT 410 at the DC voltage and the RC model will now be described according to one embodiment.

The resistance of the DUT 410 at the DC voltage is equal to the measured impedance Z of the DUT 410 at the DC voltage and a frequency of zero. This is because the impedance of the RC model is equal to the resistance when the frequency is zero. In this case, the resistance of the DUT 410 may be represented by $Z|_{s=0}$.

The capacitance of the DUT 410 may then be estimated at the DC voltage by finding an optimal capacitance $C_{opt}$ that minimizes an error between the measured impedance at the DC voltage and the impedance of the RC model over the frequency range of interest based on the following equation:

$$C_{opt} = \underset{C}{\operatorname{argmin}} \left| Z_{meas}(s) - \frac{Z|_{s=0}}{1 + sCZ|_{s=0}} \right| \quad (4)$$

where $Z_{meas}(s)$ (represents the measured impedance at the DC voltage as a function of frequency, $$\left| \frac{Z|_{s=0}}{1 + sCZ|_{s=0}} \right|$$

represents the impedance of the RC model as a function of frequency, and $Z|_{s=0}$ represents the resistance of the RC model at the DC voltage (as discussed above). The above equation determines the optimal capacitance $C_{opt}$ that minimizes the error between the measured impedance at the DC voltage and the impedance of the RC model over the frequency range. The error may be minimized using a gradient descent algorithm or other type of algorithm. The optimal capacitance $C_{opt}$ provides an estimate of the capacitance of the DUT 410 at the DC voltage.

The method described above may be repeated for each one of the plurality of DC voltages to determine the resistance and capacitance of the DUT 410 at each DC voltage, and therefore characterize the voltage-dependencies of the resistance and capacitance of the DUT 410 over the voltage range of the DC voltages.

The resistance and capacitance of the DUT 410 at a particular DC voltage may also be determined using a direct pole-fitting method. In this embodiment, the measured impedance of the DUT at the DC voltage may be input to a pole fitting algorithm that converts the measured impedance to the following single-pole equation:

$$Z = \frac{C'}{s + A'} \quad (5)$$

where $s = j2\pi f$ and represents the complex angular frequency in the Laplace domain, and C' and A' are values of the single pole equation. The impedance Z of the RC model given in equation (3) may be rewritten as:

$$Z = \frac{1/C}{s + 1/(CR)} \quad (6)$$

so that the impedance Z of the RC model corresponds to the pole equation (5). The resistance and capacitance of the DUT 410 at the DC voltage is determined by:

$$C = \frac{1}{C'}, \quad (7)$$

and $$R = \frac{C'}{A'}. \quad (8)$$

The pole-fitting method described above may be repeated for each one of the plurality of DC voltages to determine the resistance and capacitance of the DUT 410 at each DC voltage, and therefore characterize the voltage-dependencies of the resistance and capacitance of the DUT 410 over the voltage range of the DC voltages.

The modeling techniques described above according to embodiments of the present disclosure may be used to model the voltage-dependent capacitances of different types of logic devices including inverters, NAND gates, NOR gates and other logic devices.

In this regard, FIG. 6A shows an example in which any one of the modeling techniques described above may be used to determine the voltage-dependent capacitance of an inverter 605 with the input of the inverter 605 driven low. In this example, the gates of the PFET 610 and the NFET 620 are coupled to ground via a resistance 630. The resistor 630 may have a resistance equal to or greater than the resistance of a driver that will drive the input of the inverter 605 low in a downstream circuit. The voltage-dependent capacitance of the inverter 605 may then be determined by performing one of the modeling techniques described above with the inverter 605 acting as the DUT 410.

FIG. 6B shows another example in which any one of the modeling techniques described above may be used to determine the voltage-dependent capacitance of the inverter 605 with the input of the inverter 605 driven high. In this example, the gates of the PFET 610 and the NFET 620 are coupled to supply rail 622 via a resistance 640. As a result, the voltage at the input of the inverter 605 rises as the voltage at the supply rail 622 rises. The resistor 640 may have a resistance equal to or greater than the resistance of a driver that will drive the input of the inverter 605 high in a downstream circuit. The voltage-dependent capacitance of the inverter 605 may then be determined by performing one of the modeling techniques described above with the inverter 605 acting as the DUT 410.

Thus, the voltage-dependent capacitance of the inverter 605 may be characterized for two different input logic states: one in which the input of the inverter 605 is driven low (logic 0) and another in which the input of the inverter 605 is driven high (logic 1). FIG. 7 is a plot showing an example of the voltage-dependent capacitances of the inverter 605 for the two input logic states. As shown in FIG. 7, the capacitance of the inverter 605 for input logic state 0 dramatically increases once the absolute threshold voltage (e.g., 500 mV) of the PFET 610 is reached and the capacitance of the inverter 605 for input logic state 1 dramatically increases once the threshold voltage (e.g., 450 mV) of the NFET 620 is reached. The capacitances for both states stays approximately constant when the voltage approaches the nominal supply voltage.

When a downstream circuit 120 is first awakened from an inactive state, the inputs to the downstream circuit 120 are typically set to predetermined values. As a result, the state of each node in the downstream circuit 120 at power up is known, and therefore the input logic state of the inverter 605 is known. This allows a circuit designer to select the appropriate voltage-dependent capacitance model for the inverter 605 in determining the initial resistance of the power switch 130, as discussed further below.

In the above example, the voltage-dependent capacitances of the inverter 605 for the two different states are determined without a parasitic-wire capacitive load coupled to the output of the inverter 605. However, it is to be appreciated that any one of the modeling techniques described above may also be performed on the inverter 605 with a parasitic-wire capacitive load coupled to the output of the inverter 605 to account for the effects of parasitic-wire capacitance.

Figure 8:
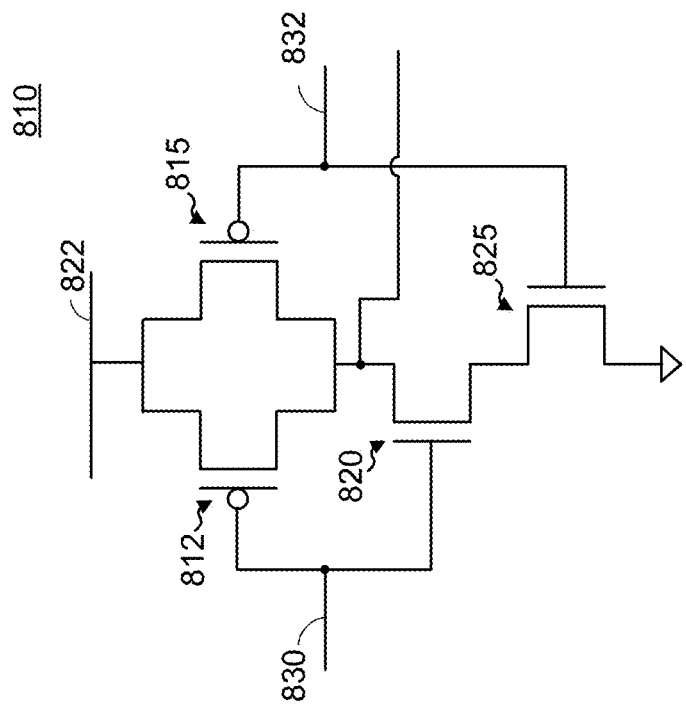
FIG. 8 shows a two-input NAND gate according to an embodiment of the present disclosure.

As discussed above, the modeling techniques described above may also be used to model the voltage-dependent capacitances of NAND gates and NOR gates. In this regard, FIG. 8 shows an example of a two-input NAND gate 810 comprising two PFETs 812 and 815 and two NFETs 820 and 825. In this example, the NAND gate 810 has four different input logic states: one in which both inputs 830 and 832 are driven low (logic 00), one in which both inputs 830 and 832 are driven high (logic 11), and two in which the inputs 830 and 832 are oppositely driven (logic 01 and 10). An input may be driven low by coupling the input to ground via a resistor, and an input may be driven high by coupling the input to the supply rail 822 via a resistor.

Figure 9:
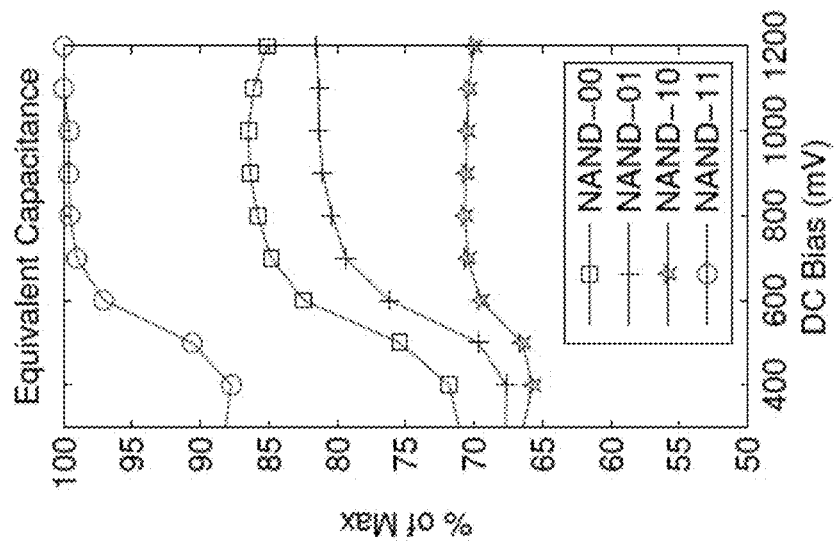
FIG. 9 is a plot showing voltage-dependent capacitances of the two-input NAND gate for four different input states according to an embodiment of the present disclosure.

Any one of the modeling techniques described above may be performed on the NAND gate 810 for each one of the four input logic states to determine the voltage-dependent capacitance of the NAND gate 810 for each state. FIG. 9 is a plot showing an example of the voltage-dependent capacitances of the NAND gate 810 for the four different input logic states.

Figure 10:
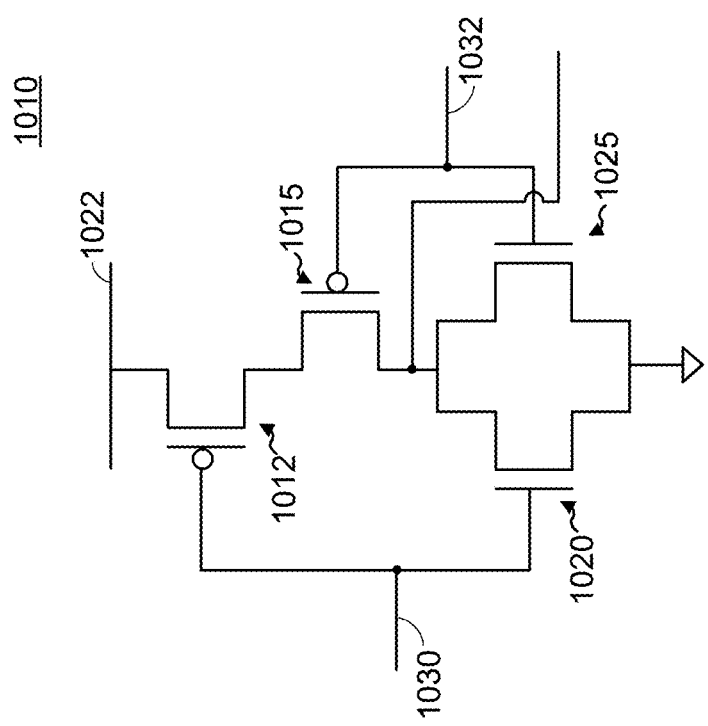
FIG. 10 shows a two-input NOR gate according to an embodiment of the present disclosure.

FIG. 10 shows an example of a two-input NOR gate 1010 comprising two PFETs 1012 and 1015 and two NFETs 1020 and 1025. In this example, the NOR gate 1010 has four different input logic states: one in which both inputs 1030 and 1032 are driven low (logic 00), one in which both inputs 1030 and 1032 are driven high (logic 11), and two in which the inputs 1030 and 1032 are oppositely driven (logic 01 and 10). An input may be driven low by coupling the input to ground via a resistor, and an input may be driven high by coupling the input to the supply rail 1022 via a resistor.

Figure 11:
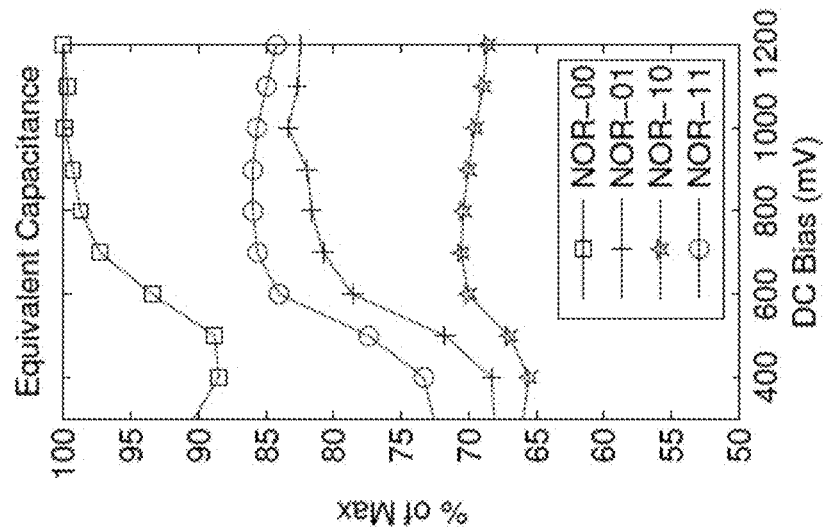
FIG. 11 is a plot showing voltage-dependent capacitances of the two-input NOR gate for four different input states according to an embodiment of the present disclosure.

Any one of the modeling techniques described above may be performed on the NOR gate 1010 for each of the four input logic states to determine the voltage-dependent capacitance of the NAND gate 1010 for each state. FIG. 11 is a plot showing an example of the voltage-dependent capacitances of the NOR gate 1010 for the four different input logic states.

Thus, the modeling techniques described above may be used to determine the voltage-dependent capacitances of various logic devices in a downstream circuit 120 including inverters, NAND gates, and NOR gates. Inverters, NAND gates and NOR gates form a universal logic set that can be used to implement various logic functions in a downstream circuit.

In one embodiment, the voltage-dependent capacitances of a plurality of logic devices may be determined separately and summed together to determine the voltage-dependent capacitance of a downstream circuit 120 comprising the plurality of logic devices. This is possible because embodiments of the present disclosure model each logic device using a parallel RC circuit model. As a result, the voltage-dependent capacitances of the logic devices are in parallel, and can therefore be summed. For each device, the input logic state of the device when the downstream circuit 120 is first powered up is determined, and the voltage-dependent capacitance of the device for the determined input logic state is used in determining the voltage-dependent capacitance of the downstream circuit. Thus, this embodiment provides a computational efficient method for determining the voltage-dependent capacitance of a system comprising many logic devices.

In another embodiment, the voltage-dependent capacitance of a circuit comprising a plurality of logic devices may be determined by performing any one of the modeling techniques described above on the entire downstream circuit. In this embodiment, the input logic state of each logic device is set the input logic state of the device when the circuit is first powered up.

Figure 12:
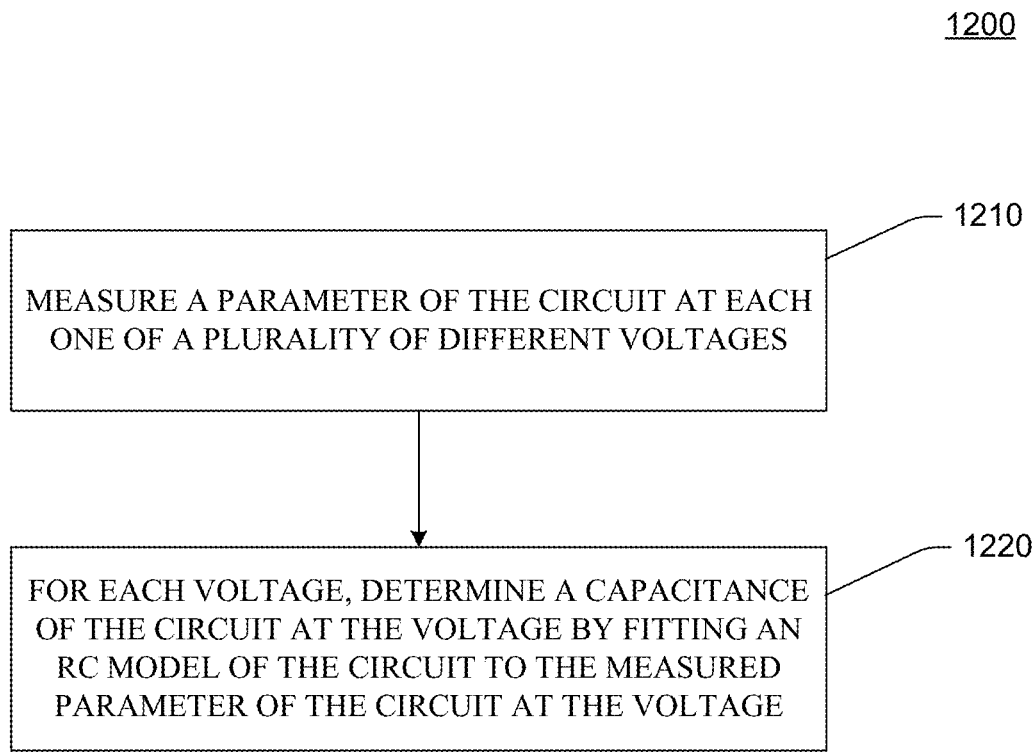
FIG. 12 shows a method for determining the voltage-dependent capacitance of a downstream circuit according to an embodiment of the present disclosure.

FIG. 12 shows a method 1200 for determining voltage-dependent capacitance of a circuit according to an embodiment of the present disclosure. In step 1210, a parameter of the circuit is measured at each one of a plurality of different voltages. For example, the impedance of the circuit over a frequency range may be measured at each voltage. In step 1220, for each voltage, a capacitance of the circuit at the voltage is determined by fitting an RC model of the circuit to the measured parameter of the circuit at the voltage. For example, for each voltage, the RC model of the circuit may be fitted to the measured impedance of the circuit at the voltage.

Figure 13:
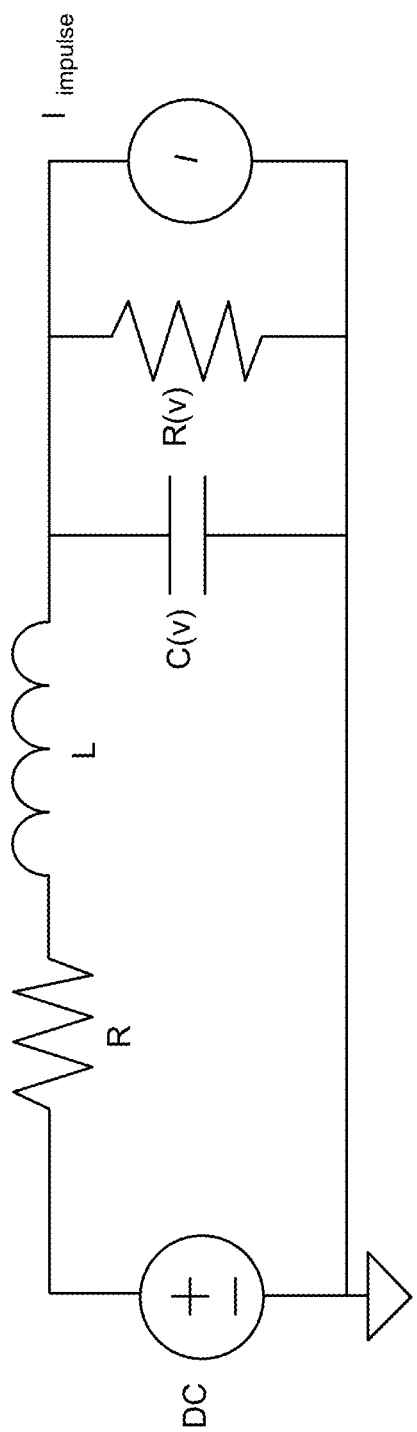
FIG. 13 shows a test setup for determining the voltage-dependent capacitance of a downstream circuit by measuring the impulse response of a PDN coupled to the downstream circuit according to an embodiment of the present disclosure.

In another embodiment, the voltage-dependent capacitance of the downstream circuit 120 is estimated by measuring the impulse response of the PDN coupled to the downstream circuit. In this regard, FIG. 13 shows an exemplary test setup, in which the downstream circuit 120 is biased by a DC power supply through a resistance R and inductor L of the PDN. In FIG. 13, the downstream circuit 120 is depicted as a voltage-dependent RC circuit. In this embodiment, the DC power supply applies a plurality of different DC voltages to the downstream circuit. At each DC voltage, a test device excites the PDN with an impulse signal $I_{impulse}$, and measures the resulting impulse response. The capacitance of the downstream circuit 120 may then be estimated for each DC voltage using the following equation:

$$C = \frac{1}{L\omega_0^2} \quad (9)$$

where $\omega_0$ is the resonant frequency of the measured impulse response at the DC voltage, L is the inductance of the PDN, and C is the capacitance of the downstream circuit 120 at the DC voltage. The resonant frequency may be determined by taking a Fourier Transform of the measured impulse response.

Figure 14:
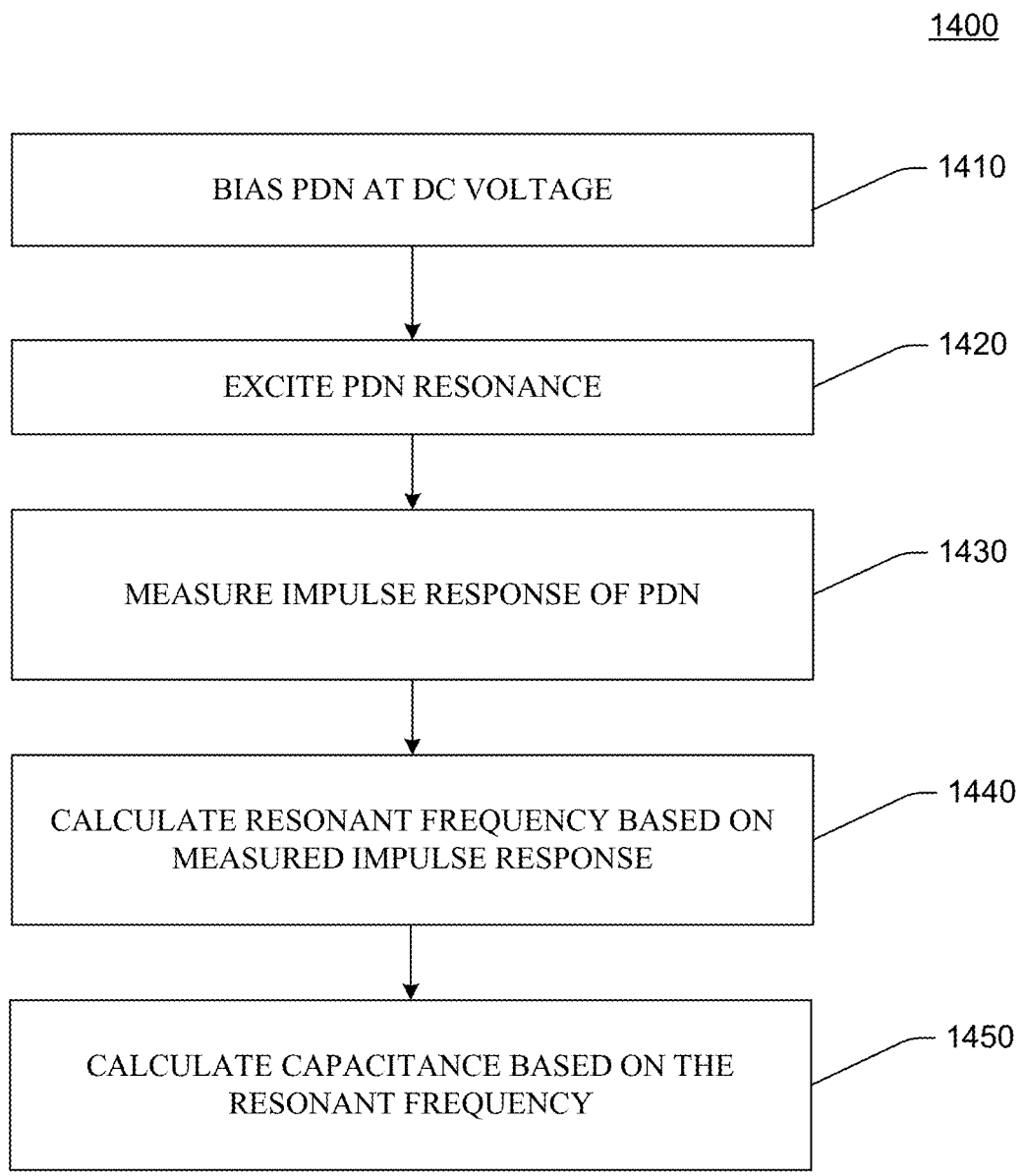
FIG. 14 shows a method for determining the voltage-dependent capacitance of a downstream circuit according to another embodiment of the present disclosure.

FIG. 14 shows a method 1400 for determining the capacitance of the downstream circuit 120 at a particular DC voltage, in which the downstream circuit 120 is coupled to a PDN. In step 1410, the PDN is biased at the DC voltage. In step 1420, PDN resonance is excited. This may be done by exciting the PDN with an impulse signal. In step 1430, the impulse response of the PDN is measured. In step 1440, the resonant frequency is calculated based on the measured impulse response. In step 1450, the capacitance of the downstream circuit 120 at the DC voltage is calculated based on the resonant frequency. For example, the capacitance may be calculated using equation (9). The method 1400 may be repeated for each one of a plurality of different DC voltages to determine the capacitance of the downstream circuit 120 at each one of the plurality of DC voltages, and therefore characterize the voltage-dependent capacitance of the downstream circuit 120.

Thus, modeling techniques according to embodiments of the present disclosure model the voltage-dependent capacitance of the downstream circuit. This allows a circuit designer to more accurately determine the capacitance of the downstream circuit 120 when the downstream circuit 120 is first awakened, and therefore better optimize the power switch 130 to reduce wakeup time while still keeping the voltage droop at the upstream circuit 115 within a particular voltage-droop limit (e.g., 5%). For example, modeling techniques according to embodiments of the present disclosure determine that the capacitance of a downstream circuit 120, as seen by the PDN, is lower when the power switch 130 is first turned on compared with conventional modeling techniques. Using this knowledge, the initial resistance of the power switch 130 can be made lower to reduce wakeup time while still keeping the voltage droop within a voltage-droop limit (e.g., 5%).

Figure 15:
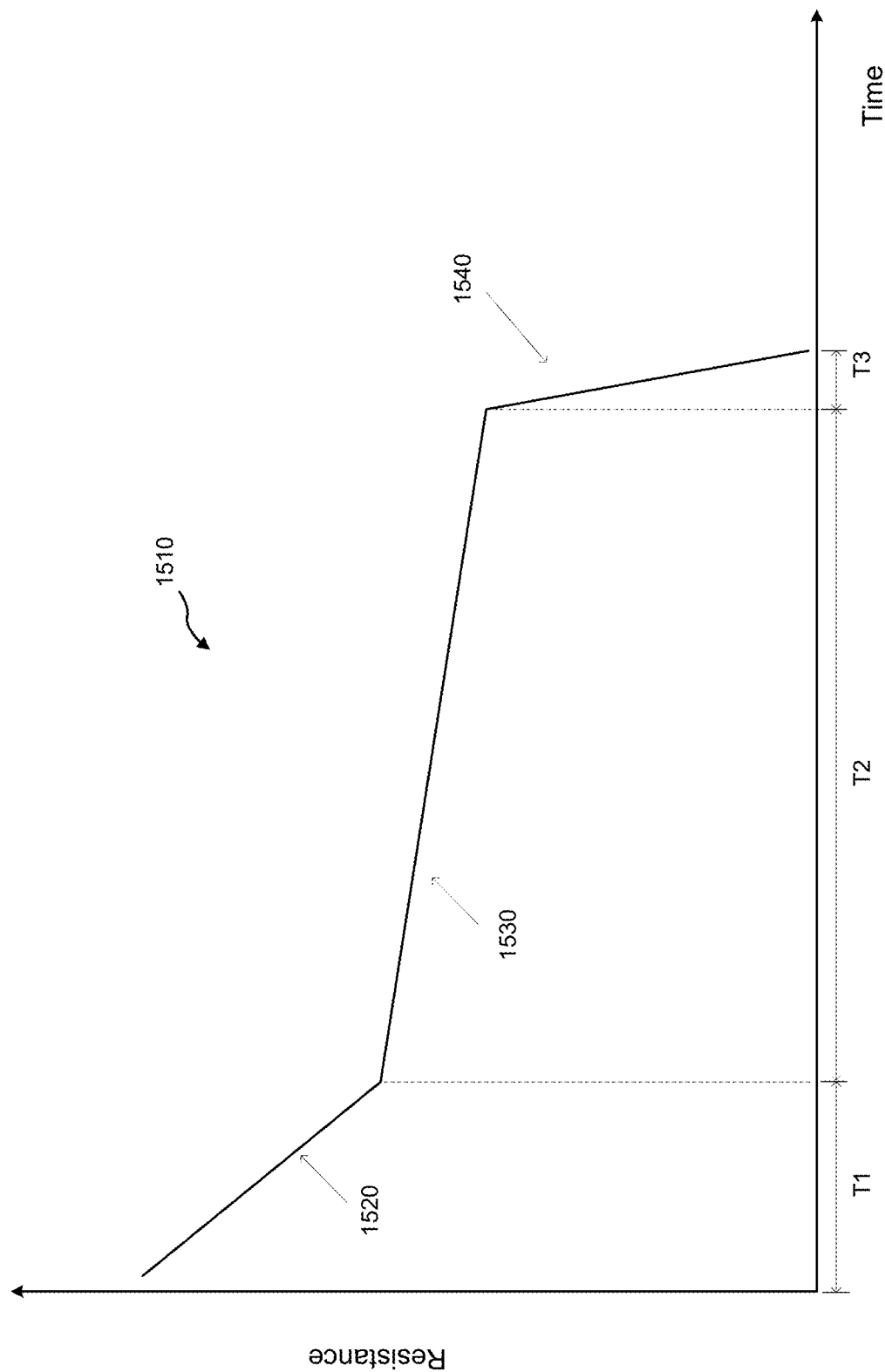
FIG. 15 shows a resistance profile of a power switch according to an embodiment of the present disclosure.

In this regard, FIG. 15 shows an example of a resistance profile 1510 of the power switch 130 that can be determined using modeling techniques according to embodiments of the present disclosure. In this embodiment, the resistance profile 1510 represents the resistance of the power switch 130 as a function of time. The resistance profile 1510 may be divided into a first time interval T1, a second time interval T2, and a third time interval T3.

The first time interval T1 begins at the time when the power switch 130 is first turned on to power up the downstream circuit 120. During the first time interval, the resistance of the power switch 130 decreases at a relatively fast rate 1520. For example, for a given voltage-droop limit (e.g., 5%), the resistance of the power switch 130 may decrease at a much faster rate than a rate that would have be determined using conventional modeling techniques. This is because embodiments of the present disclosure accurately determine that the capacitance of the downstream circuit 120, as seen by the PDN, is lower when the power switch is first turned on, and therefore that the resistance of the power switch 130 can decrease at a faster rate while still staying within the voltage-droop limit. As discussed above, the capacitance of the downstream circuit 120 is lower when the power switch 130 is first turned on compared to when the power switch has been turned on long enough for the power rail of the downstream circuit 120 to reach a voltage at which transistors in the downstream circuit 120 are turned on.

The first time interval T1 may end at a time when the power rail of the downstream circuit 120 reaches a voltage approximately equal to a threshold voltage of transistors within the downstream circuit. As discussed above, the capacitance of the downstream circuit, as seen by the PDN, increases as transistors within the downstream circuit 120 turn on and open paths to capacitors within the downstream circuit. The threshold voltage of the transistors may refer to an average of the absolute threshold voltages of the transistors.

During the second time interval T2, the resistance of the power switch 130 decreases at a slower rate 1530 compared with the first time interval T1. For example, the resistance of the power switch 130 may decrease at a rate that is 50% or more slower. This is because the capacitance of the downstream circuit, as seen by the PDN, is higher during the second time interval T2 compared with the first time interval T1. For example, during most or all of the second time interval T2, the voltage at the power rail of the downstream circuit 120 may be above the threshold voltage of transistors within the downstream circuit, in which case the transistors are turned on. As a result, the capacitance of the downstream circuit, as seen by the PDN, may be close to its final value during most or all of the second time interval T2.

The second time interval T2 may end at a time when the voltage at the power rail of the downstream circuit 120 settles to a voltage that is close to the nominal supply voltage. For example, the second time interval T2 may end when the voltage difference between the downstream circuit 120 and the nominal supply voltage is approximately equal to or smaller than the voltage-droop limit.

During the third time interval T3, the resistance of the power switch 130 may decrease at a faster rate 1540 compared with the second time interval T2 and the first time interval T1. This is because voltage droop is confined to the voltage difference between the downstream circuit 120 and the nominal supply voltage. Thus, when the voltage difference is small, even a large drop in the resistance of the power switch 130 only results in a small voltage droop.

Figure 16:
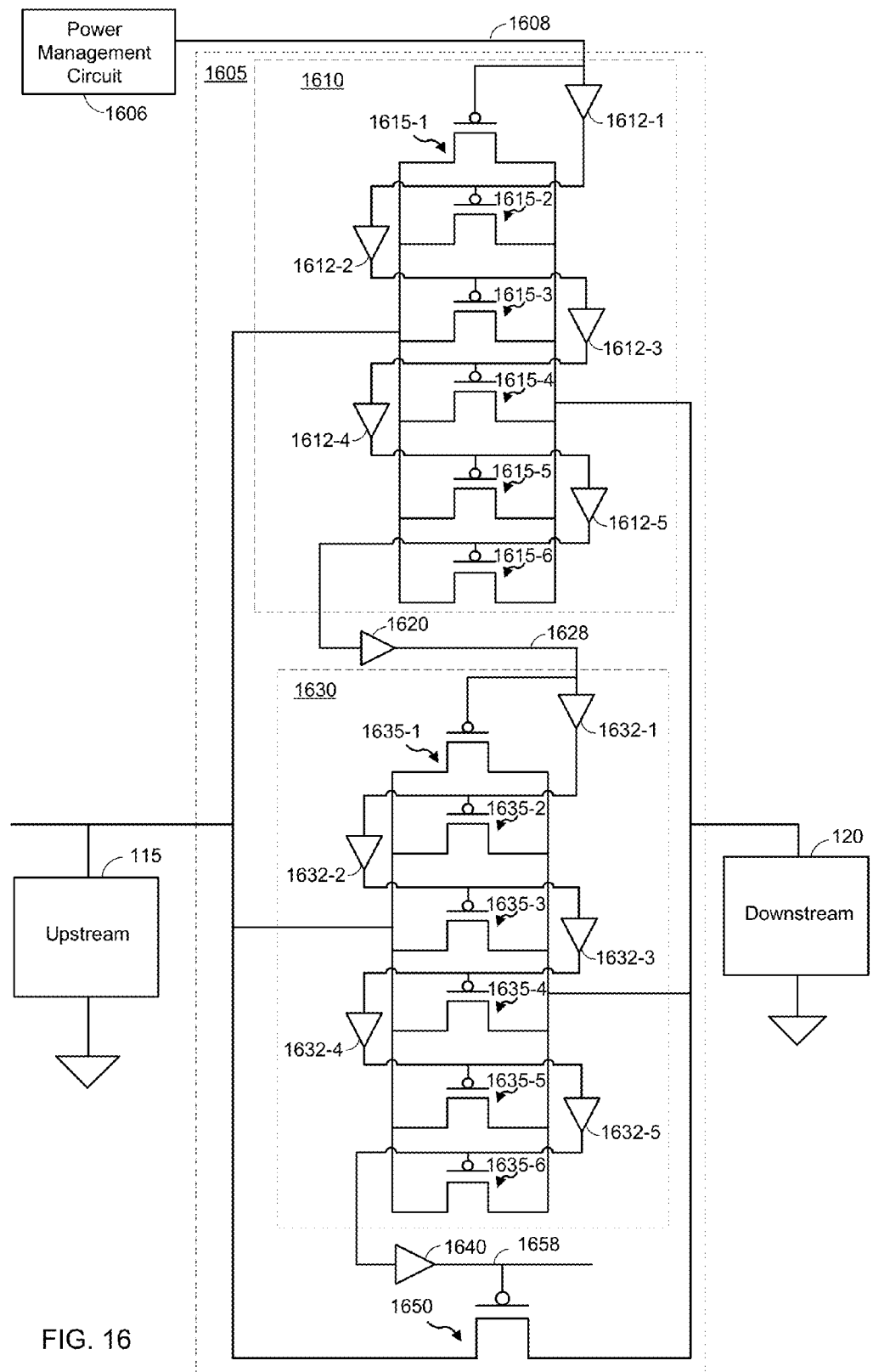
FIG. 16 shows a power switch according to an embodiment of the present disclosure.

FIG. 16 shows an example of a power switch 1605 for implementing the resistance profile 1510 shown in FIG. 15 according to an embodiment of the present disclosure. The power switch 1605 comprises a first switch circuit 1610, a second switch circuit 1630, and a third switch 1650.

The first switch circuit 1610 implements the portion of the resistance profile 1510 corresponding to the first time interval T1, and comprises a first set of switches 1615-1 to 1615-6 and a first set of delay elements 1612-1 to 1612-5. Although six switches are shown in FIG. 16 for ease of illustration, it is to be appreciated that the first set of switches 1615-1 to 1615-6 may comprise many more switches (e.g., hundreds or thousands of switches). Each of the switches 1615-1 to 1615-6 is coupled between the upstream circuit 115 and the downstream circuit 120. It is to be appreciated that FIG. 16 is not drawn to scale, and that the sizes of the switches are exaggerated with respect to the upstream circuit 115 and downstream circuit 120 for ease of illustration. In the example shown in FIG. 16, each of the switches 1615-1 to 1615-6 is implemented with a PFET. The delay elements 1612-1 to 1612-5 are coupled in series, in which the output of each delay element 1612-1 to 1612-5 is coupled to the gate of one of the switches 1615-1 to 1615-6.

When the power switch 1605 is to be turned on to power up the downstream circuit 120, a power management circuit 1606 inputs a signal 1608 to the first set of delay elements 1612-1 to 1612-5 to begin turning on the first set of switches 1615-1 to 1615-6. As the signal propagates through the first set of delay elements 1612-1 to 1612-5, the delay elements 1612-1 to 1612-5 sequentially turn on the switches 1615-1 to 1615-6. The delay between adjacent switches turning on is approximately equal to the delay of the delay element between the adjacent switches. For example, the delay between switches 1615-1 and 1615-2 turning on is approximately equal to the delay of delay element 1612-1. Although one switch is shown being turned on at a time in the example in FIG. 16 for ease of illustration, it is to be appreciated that multiple switches may be turned on at a time (e.g., when the first switch circuit 1610 comprises hundreds or thousands of switches).

The second switch circuit 1630 implements the portion of the resistance profile 1510 corresponding to the second time interval T2, and comprises a second set of switches 1635-1 to 1635-6 and the second set of delay elements 1632-1 to 1632-5. Although six switches are shown in FIG. 16 for ease of illustration, it is to be appreciated that the second set of switches 1635-1 to 1635-6 may comprise many more switches (e.g., hundreds or thousands of switches). It is also to be appreciated that the first and second set of switches may have different numbers of switches. Each of the switches 1635-1 to 1635-6 is coupled between the upstream circuit 115 and the downstream circuit 120. In the example shown in FIG. 16, each of the switches 1635-1 to 1635-6 is implemented with a PFET. The delay elements 1632-1 to 1632-5 are coupled in series, in which the output of each delay element 1632-1 to 1632-5 is coupled to the gate of one of the switches 1635-1 to 1635-6.

After the first set of switches 1615-1 to 1615-6 is turned on, a signal 1628 is input to the second set of delay elements 1632-1 to 1632-5 to begin turning on the second set of switches 1635-1 to 1635-6. The signal 1628 may be a delayed version of the signal output by the first set of switches 1612-1 to 1612-5. For example, the signal output by the first set of delay elements 1612-1 to 1612-5 may be input to the second set of delay elements 1632-1 to 1632-5 after being delayed by delay element 1620. Alternatively, the signal output by the first set of delay elements 1612-1 to 1612-5 may be input back to the power management circuit 1606 as an acknowledgement that the first set of switches 1615-1 to 1615-6 have been turned on, and the power management circuit 1606 may launch the signal 1628 after a timed delay to start turning on the second set of switches 1635-1 to 1635-6. As the signal 1628 propagates through the second set of delay elements 1632-1 to 1632-5, the delay elements 1632-1 to 1632-5 sequentially turn on the switches 1635-1 to 1635-6.

The third switch 1650 implements the portion of the resistance profile 1510 corresponding to the third time interval T3. The third switch 1650 is coupled between the upstream circuit 115 and the downstream circuit 120. The third switch 1650 may be implemented using one or more strong switches (low-resistance switches), in which each strong switch may have a much lower resistance (i.e., much higher conductance) than each of the switches in the first and second set of switches.

After the second set of switches 1635-1 to 1635-6 is turned on, a signal 1658 is input to the third switch 1650 to turn on the third switch 1650. The signal 1658 may be a delayed version of the signal output by the second set of delay elements 1632-1 to 1632-5. For example, the signal output by the second set of delay elements 1632-1 to 1632-5 may be input to the third switch 1650 after being delayed by delay element 1640. Alternatively, the signal output by the second set of delay elements 1632-1 to 1632-5 may be input back to the power management circuit 1606 as an acknowledgement that the second set of switches 1635-1 to 1635-6 have been turned on, and the power management circuit 1606 may launch the signal 1658 after a timed delay to turn on the third switch 1650. For the example in which the third switch 1650 comprises a plurality of strong switches, the strong switches may be turned at approximately the same time or the strong switches may be turned on sequentially using a set of delay elements.

Thus, the power switch 1605 has a variable resistance, in which the resistance of the power switch 1605 at a given time depends on the switches 1615-1 to 1615-6, 1635-1 to 1635-6, and 1650 that are turned on at the given time. The resistance is lowest when all of the switches are turned on. The delay elements 1612-1 to 1612-5, 1620, 1632-1 to 1632-5, and 1640 control the timing sequence for turning on the switches 1615-1 to 1615-6, 1635-1 to 1635-6, and 1650 during power up, and therefore control the resistance of the power switch 1605 during power up. Thus, the delay elements 1612-1 to 1612-5, 1620, 1632-1 to 1632-5, and 1640 may form a switch control circuit configured to control the resistance of the power switch 1605 during power up.

As discussed above, the resistance of the power switch 130 decreases at a faster rate during the first time interval T1 compared with the second time interval T2. This may be implemented using the power switch 1605 in FIG. 16 according to various embodiments of the present disclosure.

In one embodiment, the resistance of each switch in the first set of switches 1615-1 and 1615-6 may be lower than the resistance of each switch in the second set of switches 1635-1 to 1635-6. As a result, when one of the switches in the first set of switches 1615-1 to 1615-6 turns on, the resistance of the power switch 1605 drops by a larger amount than when one of the switches in the second set of switches 1635-1 to 1635-6 turns on.

In another embodiment, the delay of each delay element in the first set of delay elements 1612-1 to 1612-5 may be shorter than the delay of each delay element in the second set of delay elements 1632-1 to 1632-5. This causes the switches in the first set of switches 1615-1 to 1615-6 to turn on at a faster rate compared with the switches in the second set of switches 1635-1 to 1635-6, and therefore decrease the resistance of the power switch 1605 at a faster rate. In this embodiment, each of the switches in the first set of switches 1615-1 to 1615-6 may have approximately the same resistance as each of the switches in the second set of switches 1635-1 to 1635-6.

Figure 17:
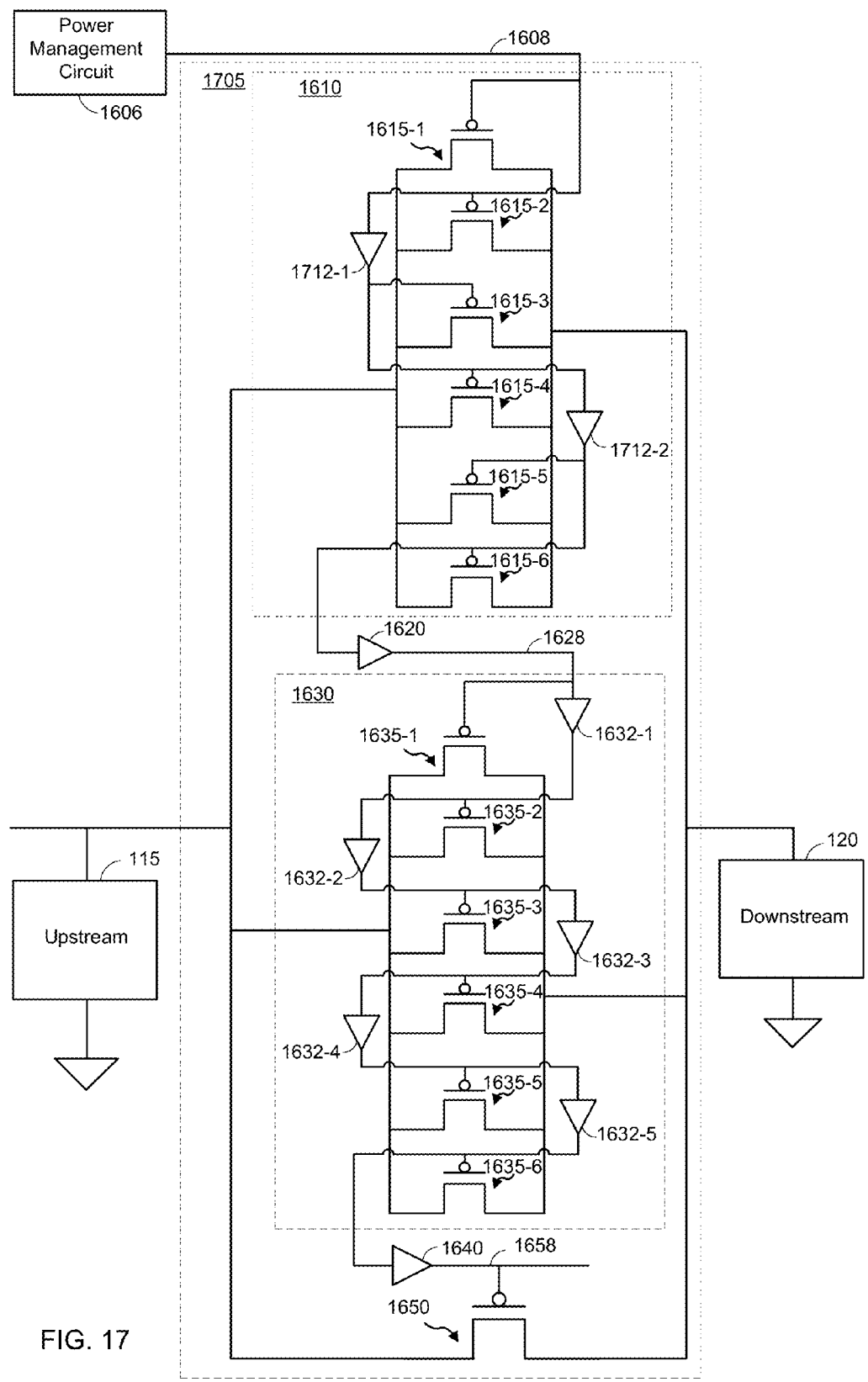
FIG. 17 shows a power switch according to another embodiment of the present disclosure.

In another embodiment, two or more switches in the first set of switches 1615-1 to 1615-6 may be turned on at a time in parallel, an example of which is shown in FIG. 17. In this example, the first switch circuit 1710 comprises a set of delay elements 1712-1 to 1712-2, in which the output of each delay element turns on two of the switches in parallel. By turning on two or more of the switches at a time in parallel during the first time interval T1, the resistance of the power switch 1705 decreases at a faster rate during the first time interval T1. In this embodiment, each of the switches in the first set of switches 1615-1 to 1615-6 may have approximately the same resistance as each of the switches in the second set of switches 1635-1 to 1635-6.

It is to be appreciated that two or more switches in the second set of switches 1635-1 to 1635-6 may also be turned on at a time in parallel. In this case, a larger number of switches in the first set of switches 1615-1 to 1615-6 may be turned on at a time compared with the second set of switches 1635-1 to 1635-6. For example, twice as many switches in the first set of switches 1615-1 to 1615-6 may be turned on at a time compared with the second set of switches 1635-1 to 1635-6.

It is to be appreciated that any two or more of the embodiments discussed above may be used in combination to make the resistance of the power switch decrease at a faster rate during the first time interval T1 compared with the second time interval T2. For example, the switches in the first set of switches 1615-1 to 1615-6 may both have a lower resistance than the switches in the second set of switches 1635-1 to 1615-6 and turn on at a faster rate.

Although the resistance profile 1510 is shown as being piece-wise linear in FIG. 15 for ease of illustration, it is to be appreciated that the resistance profile 1510 is not limited to this example. For example, the resistance of the power switch 130 does not need to decrease at a uniform rate within one of the time intervals. In this example, the rate at which the resistance of the power switch 130 decreases during a time interval may be given by an average rate at which the resistance decreases, which may be expressed as:

$$r_{avg} = \frac{\Delta R}{\Delta T} \quad (10)$$

where $r_{avg}$ is the average rate at which the resistance decreases during the time interval, $\Delta R$ is the drop in resistance across the time interval and $\Delta T$ is the duration of the time interval. For the first time interval T1, the drop in resistance $\Delta R$ may be given by the difference between the resistance of the power switch after the first switch during the first time interval T1 turns on and the resistance of the power switch after the last switch during the first time interval T1 turns on. This may be done so that the off resistance of the power switch 130 is not included in the calculation.

For the second time interval T2, the drop in resistance $\Delta R$ may be given by the difference between the resistance of the power switch after the first switch during the second interval T2 turns on and the resistance of the power switch after the last switch during the second time interval T2 turns on. Alternatively, for the second time interval T2, the drop in resistance $\Delta R$ may be given by the difference between the resistance of the power switch after the last switch during the first time interval T1 turns on and the resistance of the power switch after the last switch during the second time interval T2 turns on.

For the third time interval T3, the drop in resistance $\Delta R$ may be given by the difference between the resistance of the power switch after the first switch during the third time interval T3 turns on and the resistance of the power switch after the last switch during the third time interval T3 turns on. Alternatively, for the third time interval T3, the drop in resistance $\Delta R$ may be given by the difference between the resistance of the power switch after the last switch during the second time interval T2 turns on and the resistance of the power switch after the last switch during the third time interval T3 turns on.

As discussed above, the boundary between the first and second time intervals T1 and T2 may correspond to a time when the voltage of the downstream circuit 120 is approximately equal to the threshold voltage of transistors in the downstream circuit 120. In general, this boundary may correspond to a time when the voltage is some percentage of the threshold voltage (e.g., 70% or more of the threshold voltage, 80% or more of the threshold voltage, or 90% or more of the threshold voltage).

As discussed above, the boundary between the second and third time intervals T2 and T3 may correspond to a time when the voltage of the downstream circuit 120 settles to a voltage that is close to the nominal supply voltage. In general, this boundary may correspond to a time when the voltage is some percentage of the nominal supply voltage (e.g., 90% or more of the nominal supply voltage).

FIGS. 18A and 18B show a method 1800 for power gating in a system according to an embodiment of the present disclosure. The system comprising a circuit (e.g., downstream circuit 120) and a power switch (e.g., power switch 130) coupled between the circuit and a power supply.

In step 1810, the power switch is turned on when the circuit is to be awakened from an inactive state, as shown in FIG. 18A. Step 1810 further comprises steps 1810A and 1810B shown in FIG. 18B. In step 1810A, a resistance of the power switch is decreased at a first rate during a first time interval. In step 1810B, the resistance of the power switch is decreased at a second rate during a second time interval immediately following the first time interval, wherein the first rate is greater than the second rate, and a boundary between the first and second time intervals corresponds to a time at which a voltage of the circuit approximately reaches a threshold voltage of transistors in the circuit. As discussed above, the threshold voltage of the transistors may refer to an average of the absolute threshold voltages of the transistors.

Those skilled in the art will appreciate that the circuits described herein may be realized using a variety of transistor types, and are therefore not limited to the particular transistor types shown in the figures. For example, transistor types such as bipolar junction transistors, junction field effect transistor or any other transistor type may be used. Those skilled in the art will also appreciate that the circuits described herein may be fabricated with various IC process technologies such as CMOS, bipolar junction transistor (BJT), bipolar-CMOS (BiCMOS), silicon germanium (SiGe), gallium arsenide (GaAs), etc.

Those skilled in the art will also appreciate that a method described herein (e.g., a method for modeling the voltage-dependent capacitance of a circuit) may be embodied in a computer program (e.g., software) stored on a computer-readable medium, in which the computer program comprises code (instructions) that is executable by a processor (e.g., a general-purpose processor) for performing the method. The computer-readable medium may comprise a RAM memory, a flash memory, a hard disk, a removable disk, a CD-ROM or other optical disk storage, or any other form of computer-readable medium known in the art.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system, comprising:
   a circuit; and
   a power switch that connects the circuit to a power supply when the circuit is in an active state, and disconnects the circuit from the power supply when the circuit is in an inactive state, wherein the power switch has a variable resistance; and
   a switch control circuit that controls the resistance of the power switch as the circuit powers up from the inactive state to the active state by decreasing the resistance of the power switch at a first rate during a first time interval, and decreasing the resistance of the power switch at a second rate during a second time interval immediately following the first time interval, wherein the first rate is at least two times greater than the second rate, a boundary between the first and second time intervals corresponds to a time at which a voltage of the circuit reaches a threshold voltage of transistors in the circuit, and the switch control circuit comprises delay elements coupled in series, wherein the first rate and the second rate depend on delays of the delay elements.

2. The system of claim 1, wherein the switch control circuit is configured to decrease the resistance of the power switch at a third rate during a third time interval following the second time interval, and the third rate is greater than the first and second rates.

3. The system of claim 2, wherein a boundary between the second and third time intervals corresponds to a time when the voltage of the circuit is equal to or greater than 90 percent of a nominal supply voltage of the power supply.

4. The system of claim 1, wherein the power switch comprises a first plurality of switches and a second plurality of switches, and the switch control circuit is configured to turn on the first plurality of switches during the first time interval, and turn on the second plurality of switches during the second time interval.

5. The system of claim 4, wherein the first plurality of switches are turned on at a faster rate than the second plurality of switches.

6. The system of claim 4, wherein at least two switches in the first plurality of switches are turned on in parallel.

7. The system of claim 4, wherein each of the first plurality of switches has a lower resistance than each of the second plurality of switches.

8. The system of claim 1, wherein the first time interval begins at a time at which the voltage of the circuit is equal to zero volts and ends at the time at which the voltage of the circuit reaches the threshold voltage of the transistors in the circuit, and the second time intervals begins at the time at which the voltage of the circuit reaches the threshold voltage of the transistors in the circuit and ends at a time at which the voltage of the circuit is equal to or greater than 90 percent of a nominal supply voltage of the power supply.

9. The system of claim 1, wherein the power switch is configured to connect a power rail of the circuit to the power supply when the circuit is in the active state, to disconnect the power rail of the circuit from the power supply when the circuit is in the inactive state, and the voltage of the circuit is a voltage of the power rail of the circuit.

10. A method for power gating in a system comprising a circuit and a power switch coupled between the circuit and a power supply, the method comprising:
    turning on the power switch when the circuit is to be awakened from an inactive state, wherein turning on the power switch comprises:
       decreasing a resistance of the power switch at a first rate during a first time interval; and
       decreasing the resistance of the power switch at a second rate during a second time interval immediately following the first time interval, wherein the first rate is at least two times greater than the second rate, and a boundary between the first and second time intervals corresponds to a time at which a voltage of the circuit reaches a threshold voltage of transistors in the circuit.

11. The method of claim 10, further comprising decreasing the resistance of the power switch at a third rate during a third time interval following the second time interval, wherein the third rate is greater than the first and second rates.

12. The method of claim 11, wherein a boundary between the second and third time intervals corresponds to a time when the voltage of the circuit is equal to or greater than 90 percent of a nominal supply voltage of the power supply.

13. The method of claim 10, wherein the power switch comprises a first plurality of switches and a second plurality of switches, and the method further comprises:
    turning on the first plurality of switches during the first time interval; and
    turning on the second plurality of switches during the second time interval.

14. The method of claim 13, wherein the first plurality of switches are turned on at a faster rate than the second plurality of switches.

15. The method of claim 13, wherein at least two switches in the first plurality of switches are turned on in parallel.

16. The method of claim 13, wherein each of the first plurality of switches has a lower resistance than each of the second plurality of switches.

17. An apparatus for power gating in a system comprising a circuit and a power switch coupled between the circuit and a power supply, the apparatus comprising:
    means for turning on the power switch when the circuit is to be awakened from an inactive state, wherein the means for turning on the power switch comprises:
       means for decreasing a resistance of the power switch at a first rate during a first time interval; and
       means for decreasing the resistance of the power switch at a second rate during a second time interval immediately following the first time interval, wherein the first rate is at least two times greater than the second rate, and a boundary between the first and second time intervals corresponds to a time at which a voltage of the circuit reaches a threshold voltage of transistors in the circuit.

18. The apparatus of claim 17, further comprising means for decreasing the resistance of the power switch at a third rate during a third time interval following the second time interval, wherein the third rate is greater than the first and second rates.

19. The apparatus of claim 18, wherein a boundary between the second and third time intervals corresponds to a time when the voltage of the circuit is equal to or greater than 90 percent of a nominal supply voltage of the power supply.

20. The apparatus of claim 17, wherein the power switch comprises a first plurality of switches and a second plurality of switches, and the apparatus further comprises:
- means for turning on the first plurality of switches during the first time interval; and
- means for turning on the second plurality of switches during the second time interval.

21. The apparatus of claim 20, wherein the first plurality of switches are turned on at a faster rate than the second plurality of switches.

22. The apparatus of claim 20, wherein at least two switches in the first plurality of switches are turned on in parallel.

23. The apparatus of claim 20, wherein each of the first plurality of switches has a lower resistance than each of the second plurality of switches.

* * * * *